US008718358B2

(12) United States Patent
Yokoyama et al.

(10) Patent No.: US 8,718,358 B2
(45) Date of Patent: May 6, 2014

(54) FILLER METAL INSTALLATION POSITION CHECKING METHOD AND FILLER METAL INSTALLATION POSITION CHECKING SYSTEM

(75) Inventors: Hiroshi Yokoyama, Tokyo (JP); Yuichi Yamamoto, Tokyo (JP); Shinichi Ebata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1214 days.

(21) Appl. No.: 12/292,382

(22) Filed: Nov. 18, 2008

(65) Prior Publication Data

US 2009/0144008 A1 Jun. 4, 2009

(30) Foreign Application Priority Data

Nov. 29, 2007 (JP) .................................. 2007-308732

(51) Int. Cl.
*G06K 9/00* (2006.01)
(52) U.S. Cl.
USPC .......................................... 382/155; 382/149
(58) Field of Classification Search
USPC .......................................... 382/155, 149, 145
See application file for complete search history.

(56) References Cited

U.S. PATENT DOCUMENTS

| 5,872,862 | A * | 2/1999 | Okubo et al. | 382/151 |
| 2003/0235324 | A1* | 12/2003 | Lee et al. | 382/100 |
| 2005/0002562 | A1* | 1/2005 | Nakajima et al. | 382/159 |
| 2006/0182334 | A1* | 8/2006 | Akimoto | 382/145 |

FOREIGN PATENT DOCUMENTS

| JP | A-8-218633 | 8/1996 |
| JP | A-2003-166814 | 6/2003 |
| JP | A-2004-302756 | 10/2004 |
| JP | A-2006-214472 | 8/2006 |
| JP | A-2007-4293 | 1/2007 |
| JP | A-2007-103645 | 4/2007 |

OTHER PUBLICATIONS

Notification of Reason(s) for Refusal dated May 1, 2012 in Japanese Patent Application No. 2007-308732 (with translation).

* cited by examiner

*Primary Examiner* — Hadi Akhavannik
(74) *Attorney, Agent, or Firm* — Oliff PLC

(57) ABSTRACT

The present invention is a filler metal installation position checking method and a filler metal installation position checking system for confirming difference between installation position and designed position of a filler metal embedded in a wall surface. A standard surface target 16 having known actual dimension and position to a wall surface 12 is provided to the wall surface 12 where a filler metal 14 is installed. The wall surface 12 is photographed together with the standard surface target 16 to create image data 18. Using actual position and dimension of the standard surface target 16 and position and dimension of the standard surface target 16 on an image displayed by the image data 18, the image data 18 is converted into corrected image data 20 displaying an image corrected in a manner that the image is photographed from front of the wall surface. Design CAD data 22 showing actual designed position of the filler metal is read out and the images shown by the corrected image data 20 and the design CAD data 22 are outputted as images on one same display.

12 Claims, 6 Drawing Sheets

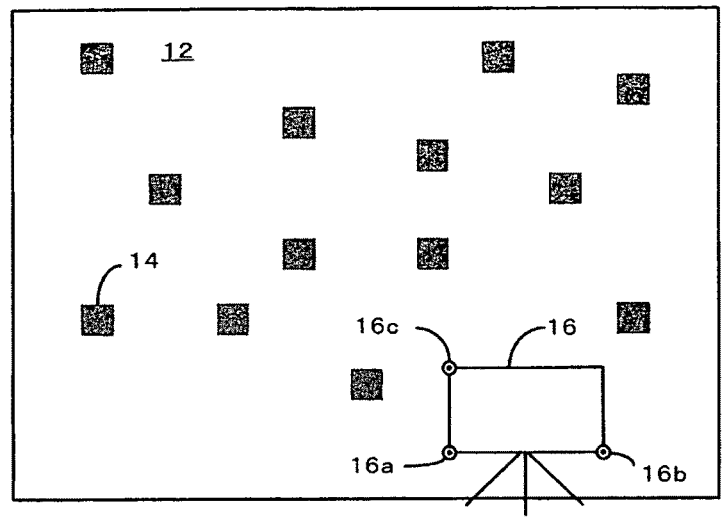
Fig.1-a
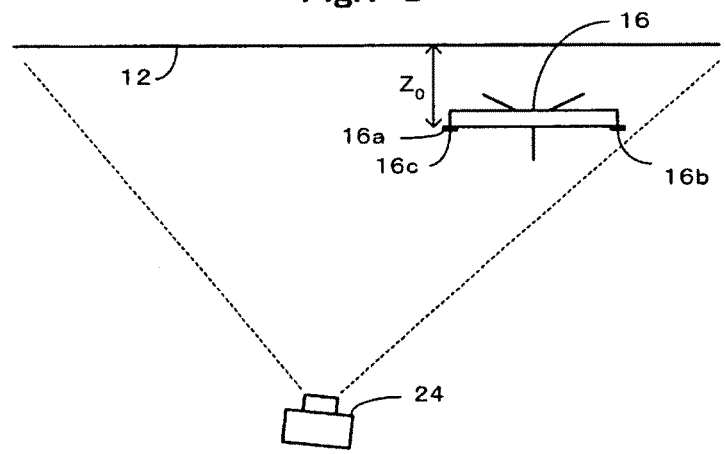
Fig.1-b
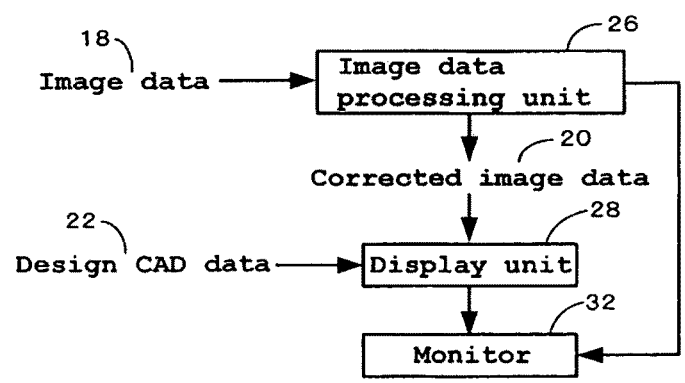
Fig.1-c

Fig.4-a
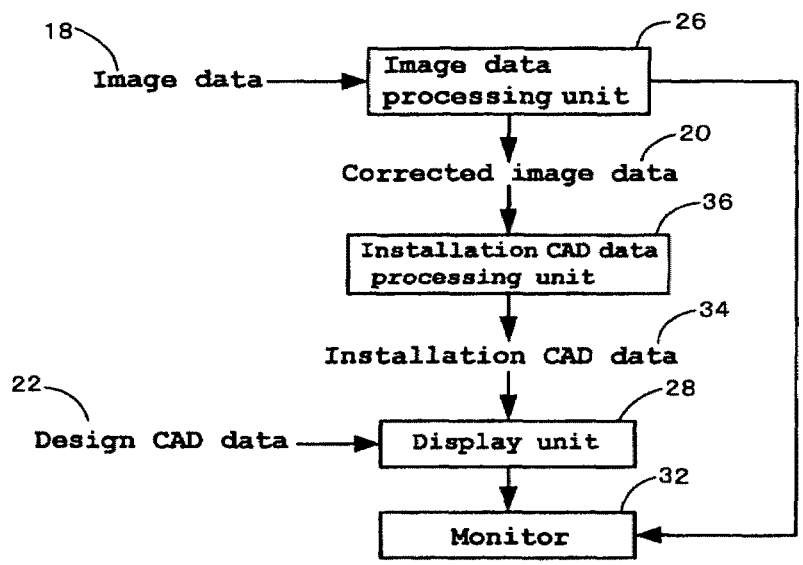
Fig.4-b
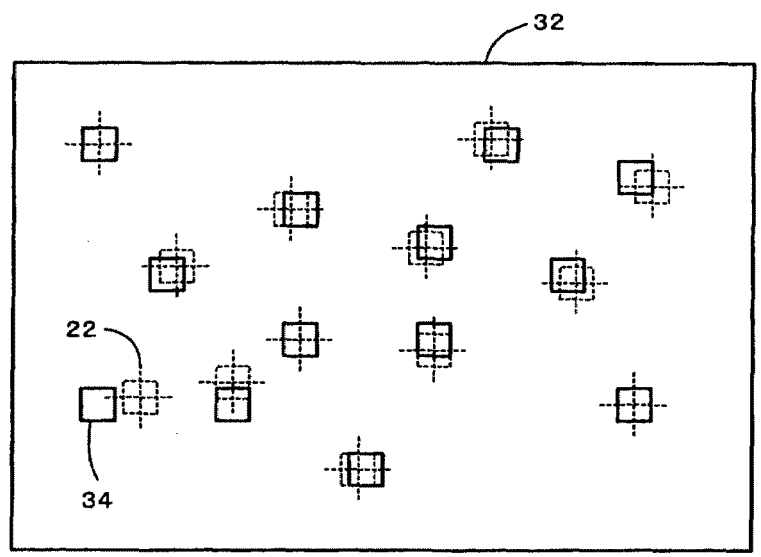

Fig.5-a
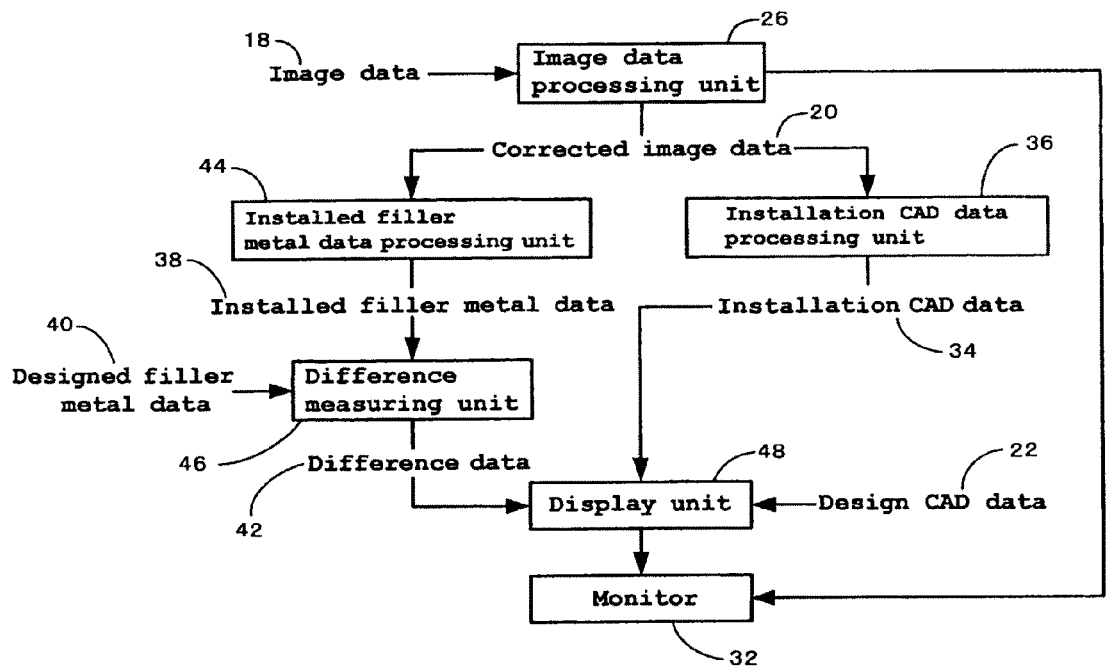
Fig.5-b
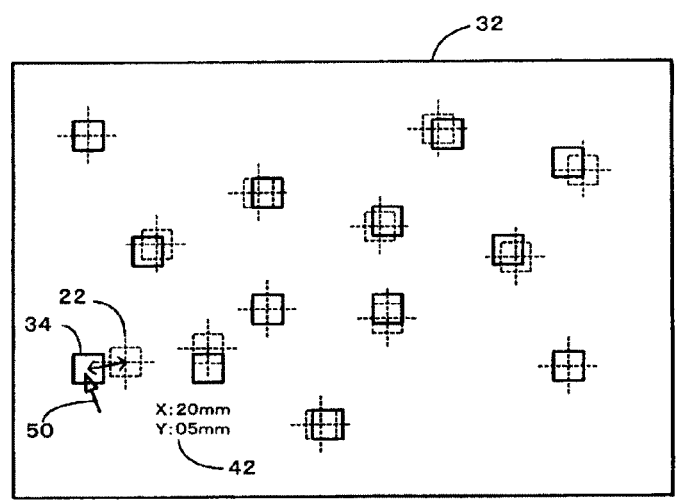

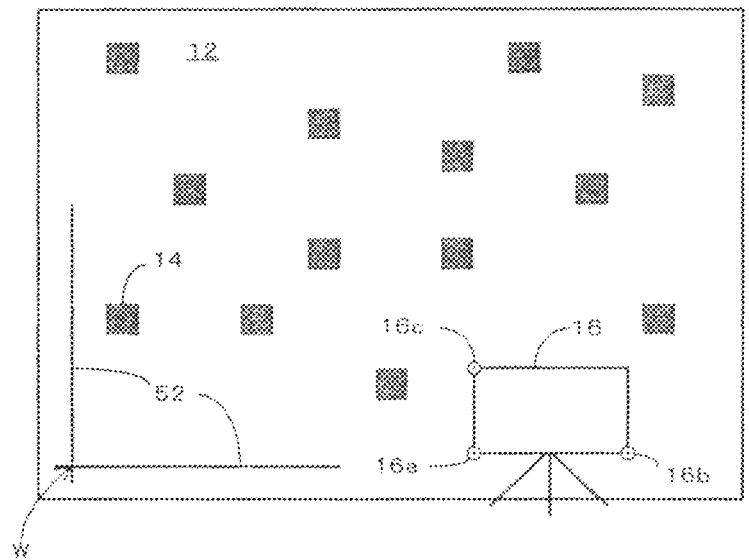
Fig.6-a
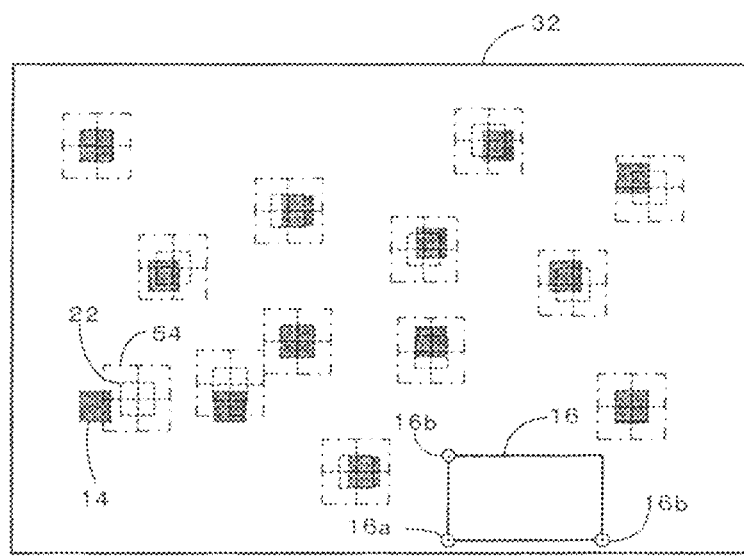
Fig.6-b

FILLER METAL INSTALLATION POSITION CHECKING METHOD AND FILLER METAL INSTALLATION POSITION CHECKING SYSTEM

BACKGROUND OF THE INVENTION

1. Field of the Invention

The present invention relates to a filler metal installation position checking method for confirming installation condition of a filler metal installed in a wall surface and to a filler metal installation position checking system.

2. Description of the Related Art

A metal member (filler metal) such as a built-in anchor is used as a foundation for installing a pipe on a wall surface via a support member in a nuclear power plant or the like. The filler metal is installed simultaneously when concrete, which is a target of installation, is cast and as the concrete is consolidated, the filler metal is fixed in the concrete in an embedded condition. In this case, because the filler metal may be fixed in a position which is different from the originally designed position, it is required to check whether or not actual position of the filler metal is within a permissible range of the design.

According to a conventional checking of filler metal installation position, a worker brings a sheet of drawing to the site and compares the actual position of the filler metal with the drawing to check the filler metal installation position. Moreover, in a spot such as a high place, where it is difficult to carry out checking of position, scaffolding is set to check the position.

According to a conventional technique, difference between the actual installation position and designed position regulated by the design data is not measured and a problem caused by the difference is discussed on site. A technique to check difference between installed position and designed position includes the Patent Document 1.

[Patent Document 1] Japanese Unexamined Patent Publication No. 2007-103645

As mentioned above, the conventional technique is limited to comparison between the drawing and actual condition. Therefore, there occurs a problem such as making an oversight or correct measurement is not carried out and detailed comparison between actual position and designed position cannot be carried out. In the conventional technique, although design data is defined as CAD data, an image is created on the basis of the CAD data and only comparison with an image created on the basis of the image of the site that is photographed from front and design data is carried out in actuality. Therefore, it is impossible to check the installation position of the metal photographed by a worker in a free condition and to easily carry out detailed comparison between actual position and designed position on the CAD system.

SUMMARY OF THE INVENTION

Therefore, the present invention aims at providing a method and a system for solving the above-mentioned problems of the conventional technique and for carrying out detailed comparison between actual position of an object installed in a wall surface such as a filler metal and designed position thereof with an operator in a free condition.

The inventor took a current condition where a digital camera, which is easy to handle and has high pixels, is widely spread into consideration and made a judgment that using a digital camera makes it possible to carry out measurement using an image which meets a need of the site.

A filler metal installation position checking method for achieving the above-mentioned purpose includes steps of: providing a standard surface target with known dimension and position to a wall surface where a filler metal is installed; creating image data by taking a photograph of the wall surface together with the standard surface target; converting the image data into corrected image data displaying an image corrected in a manner that the image is photographed from front of the wall surface by use of an actual position and dimension of the standard surface target and position and dimension of the standard surface target on an image displayed by the image data; reading design CAD data displaying actual designed position of the filler metal; and outputting the corrected image data and the design CAD data respectively as images to be displayed on one same display.

According to such a configuration, an image photographed from front, which is obtained from an image photographed on site at an arbitrary position with an arbitrary posture, and an image of design CAD data showing designed position of the filler metal are displayed on one same display in an overlapping manner. Therefore, it becomes possible to visually judge difference between designed position of the filler metal and actual installation position on the display. Moreover, it becomes unnecessary to go to the site where the filler metal is installed and to check the actual position with a drawing or the like. Therefore, it becomes possible to efficiently check a problem with the installation position of the filler metal. Further, since photograph can be taken at an arbitrary position with an arbitrary posture, is becomes possible to check a problem with the installation position of the filler metal efficiently without using a large-scale surveying tool.

Further, a filler metal installation position checking system according to the present invention may include: a standard surface target with known actual dimension and position to a wall surface where a filler metal is installed, a camera for photographing the wall surface including the standard surface target to create image data, an image data processing unit for converting the image data into corrected image data displaying an image corrected in a manner that the image is photographed from front of the wall surface and outputting the corrected image data by use of the actual position and dimension of the standard surface target and position and dimension of the standard surface target on an image displayed by the image data, and a display unit for inputting the corrected image data and design CAD data which shows actual designed position of the filler metal and for outputting the corrected image data and the design CAD data respectively as an image on one same display.

According to such a configuration, it becomes possible to configure a filler metal installation position checking system which allows a user to visually judge difference between designed position of the filler metal and actually installed installation position because an image photographed from front, which is obtained from an image photographed on site at an arbitrary position with an arbitrary posture, and an image of the design CAD data showing designed position of the filler metal are displayed on one same display. Moreover, it becomes possible to configure a filler metal installation position checking system which allows a user to efficiently carry out checking a problem with the installation position of the filler metal because it becomes unnecessary to go to the site where the filler metal is installed and to check the actual position with a drawing or the like. Further, since the photograph can be taken at an arbitrary position with an arbitrary posture, it becomes possible to configure a filler metal installation position checking system which allows a user to check a problem with the installation position of the filler metal efficiently without using a large-scale surveying tool.

BRIEF DESCRIPTION OF THE DRAWINGS

FIG. 1-a is a schematic front view showing condition of a site where a wall surface in which a filler metal of a first embodiment is installed is photographed.

FIG. 1-b is a plan view of FIG. 1-a.

FIG. 1-c is a processing flow of image data photographed in the first embodiment.

FIG. 4-a is a processing flow of image data photographed in a second embodiment.

FIG. 4-b is an example of an outputted image in the second embodiment.

FIG. 5-a is a processing flow in a third embodiment.

FIG. 5-b is an example of an outputted image in the third embodiment.

FIG. 6-a is a front view of a wall which is a photographing target, the view being an explanatory view of a common modification example of the first to third embodiments.

FIG. 6-b is an example of a displayed image of the modification example.

DETAILED DESCRIPTION OF THE PREFERRED EMBODIMENTS

Figure 2:
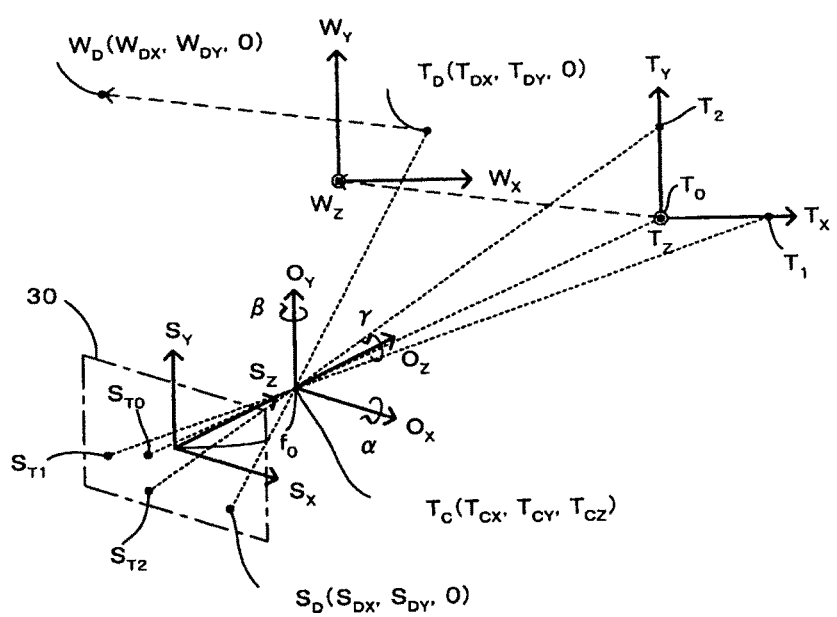
FIG. 2 is a schematic view showing coordinate system relationship used in the first embodiment.

Hereinafter, embodiments of the present invention will be explained with reference to figures.

A filler metal installation position checking method and a filler metal installation position checking system according to a first embodiment are shown in FIG. 1.

In the filler metal installation position checking method according to the first embodiment, a standard surface target 16 having known actual dimension and position to a wall surface 12 is provided to the wall surface 12 where a filler metal 14 is installed. The wall surface 12 is photographed together with the standard surface target 16 to create image data 18. Using actual position and dimension of the standard surface target 16 and position and dimension of the standard surface target 16 on an image displayed by the image data 18, the image data 18 is converted into corrected image data 20 displaying an image corrected in a manner that the image is photographed from front of the wall surface 12. Design CAD data 22 showing actual designed position of the filler metal 14 is read out and the corrected image data 20 and the design CAD data 22 are respectively outputted as images on one same display. A filler metal installation position checking system 10 according to the first embodiment includes the standard surface target 16 having known actual dimension and position to the wall surface 12 where the filler metal 14 is installed, and a digital camera 24 for creating the image data 18 by photographing the wall surface 12 together with the standard surface target 16. Moreover, the filler metal installation position checking system 10 also includes an image data processing unit 26 for converting the image data 18 into the corrected image data 20 displaying the corrected image in a manner that the image data 18 is photographed from front of the wall surface 12 and outputting the corrected image data by use of actual position and dimension of the standard surface target 16 and position and dimension of the standard surface target 16 on an image displayed by the image data 18. Further, the filler metal installation position checking system 10 includes a display unit 28 for inputting the corrected image data 20 and design CAD data 22 indicating actual designed position of the filler metal 14 to output the corrected image data 20 and the design CAD data 22 respectively as images on one same display.

FIG. 1-a is a front view showing a site where the wall surface 12 in which the filler metal 14 is installed is photographed together with the standard surface target 16 by the digital camera 24 and FIG. 1-b is a plan view thereof. The wall surface 12 shown in FIGS. 1-a and 1-b is a target for installing the filler metal 14 which fixes a piping and is assumed to be a flat surface without warping. The filler metal 14 is installed in the wall surface 12 on the basis of designed position described in later-described design CAD data. However, as mentioned above, actual installation position differs from the designed position. Moreover, it is assumed that the filler metal 14 is on the same flat surface as the wall surface 12 without being buried in the wall surface 12 or protruding from the wall surface 12.

The standard surface target 16 has a rectangular shape and is provided in front of the wall surface 12 while being supported by a stand or the like. The standard surface target 16 is to be a reference mark for correcting the image data 18 which is photographed and formed by the digital camera 24. At the corners of the rectangular standard surface target 16, reference mark members 16a, 16b, and 16c are provided to be later-described reference marks $T_0$, $T_1$, and $T_2$ respectively. These points configure a later-described actual standard coordinate T. Moreover, for easy of confirming the reference marks $T_0$, $T_1$, and $T_2$, high-intensity LED or the like (not shown) may be provided at each position of reference marks. Color of the LED may be changed for each reference mark so that an operator or the later-described image data processing unit 26 can easily recognize.

The digital camera 24 takes a photograph of the wall surface 12 including the standard surface target 16 and transforms color or brightness of an image taken with a focus on an imaging area 30 into data for each dot D to create the image data 18. Therefore, the larger number of the dot D is, the higher resolution of the image in the imaging area 30 becomes. It is assumed that a focal length $f_0$ of a lens of the digital camera 24 (not shown) and distortion are known. Moreover, the image data 18 thus created is stored in a memory means (not shown) incorporated or inserted in the digital camera 24 (not shown) and is transferred to the later-described image data processing unit 26 via a data reader (not shown) or the like provided to a personal computer (not shown). Further, the focal position of the digital camera 24 becomes an origin of an optical axis coordinate O having a later-described dimensional length and center position of the rectangular imaging area 30 of the digital camera 24 becomes a later-described origin of an imaging coordinate S on a non-dimensional image.

Processing flow of the photographed image data 18 is shown in FIG. 1-c. In FIG. 1-c, the image data processing unit 26 is an application installed in a personal computer (not shown) The image data 18 stored in the memory means (not shown) is inputted into the image data processing unit 26 and converted into an image seen from front of the wall surface 12 by operation using later-described photogrammetry, and the corrected image data 20 having an extension which can be recognized by the later-described display unit 28 is outputted. The image data processing unit 26 is programmed to read out the image data 18 stored in the memory means (not shown) via a data reader (not shown). Moreover, the image data processing unit 26 includes a non-dimensional plane coordinate P which is a plane orthogonal coordinate system for outputting an image on a monitor 32 with a dot $D_P$ as its minimum unit and is programmed to allocate the dot D configuring image data 18 to the dot $D_P$ while maintaining same array. Therefore, not only can the image data processing unit 26 understand position information of the image data 18 for each dot D on the basis of the plane coordinate P, but the image data processing unit 26 can output the image data 18 on the monitor 32 following the plane coordinate P. Further, the image data processing unit 26 is programmed so that position information of a cursor (not shown) indicated by a mouse means (not shown) of the personal computer (not shown) can be inputted on the monitor 32 corresponding to the position information in the plane coordinate P. Thus, an operator can designate the reference marks $T_0$, $T_1$, and $T_2$ shown in the plane coordinate P by controlling a mouse while seeing the monitor 32 where the image data 18 is displayed. Otherwise, the image data processing unit 26 may be programmed so that the image data processing unit 26 can recognize the position of the reference marks $T_0$, $T_1$, and $T_2$ on the plane coordinate P by comparing existing points of the above-mentioned high-intensity LED (not shown) displayed on the image data 18 with brightness of the other parts and further can identify the reference marks by identifying the color of the high-intensity LED (not shown). Further, the image data processing unit 26 is programmed so that operation by photogrammetry is carried out when positions of each of the reference marks on the plane coordinate P, positions of each of the reference marks on later-described standard coordinate T, and that focal length $f_0$ of the digital camera 24 are inputted and the corrected image data 20 in which dot D on the imaging coordinate S is converted into a wall surface coordinate W is outputted on the basis of the plane coordinate P. Further, the image data processing unit 26 is programmed so that a numerical value showing position of each of the later-described reference marks $T_0$, $T_1$, and $T_2$ on the wall surface coordinate W shown by the corrected image data 20 can be inputted by key operation of the personal computer.

In the present embodiment, designed position and actual installation position of the filler metal are compared by photogrammetry. Photogrammetry used in the present embodiment is a method to calculate camera posture information by taking positional relation between a plurality of points designated as reference marks on an actual coordinate, coordinate on the image of the site, and camera inside information such as focal length of the camera into consideration and to calculate position information of an arbitrary point. As a notion, if an object having, for example, a square shape is photographed from an angle, the object is deformed to have a trapezoidal shape. Therefore, calculation is carried out by numerically estimating how much three-dimensional inclination is required to reform the shape of the deformed square. For this purpose, it is required to understand the relation between the above-mentioned wall surface coordinate W, the standard coordinate T, the optical axis coordinate O, and the imaging coordinate S. Thus, the dot D on the imaging coordinate S is coordinate transformed on the wall surface coordinate W to convert the image data 18 created through the imaging surface 30 into an image seen from front so that the corrected image data 20 can be created.

FIG. 2 shows relation between the wall surface coordinate W, the standard coordinate T, the optical axis coordinate O, and the imaging coordinate S.

The wall surface coordinate W ($W_X$, $W_Y$, $W_Z$) is configured as an orthogonal coordinate system having an axis in horizontal direction of the wall surface 12 as an X axis, an axis in vertical direction to the X axis as a Y axis, and an axis in normal line direction to the wall surface 12 as a Z axis and has a dimension of length on the basis of actual dimension of the wall surface 12. Although origin of the wall surface coordinate W may be any point on the wall surface 12, difference between X axis component, Y axis component, and Z axis component of origin of the later-described standard coordinate T must be known ($X_0$, $Y_0$, $Z_0$, respectively) and must exist on the surface displayed by the later-described image data 18. Moreover, the origin of the wall surface coordinate W matches with origin of the later-described design CAD data 22.

With reference mark $T_0$ as origin, the standard coordinate T ($T_X$, $T_Y$, $T_Z$) is configured to be an orthogonal coordinate system having a dimension of length by a vector that is from the $T_0$ to $T_1$, a vector from the $T_0$ to $T_2$ which is perpendicular to the former vector, and a vector perpendicular to the former two vectors on the basis of the reference marks $T_0$, $T_1$ and $T_2$. Here, it is assumed that the reference marks $T_0$ and $T_1$ are designed at the same height when seen from the wall surface coordinate W and the reference mark $T_2$ is designed to be positioned above the reference mark $T_0$. It is assumed that actual distance from the wall surface 12 to the reference marks $T_0$, $T_1$, and $T_2$ in Z-axis direction is equal to each other ($Z_0$) on the wall surface coordinate W. Moreover, it is assumed that actual positions of the reference marks $T_0$, $T_1$, and $T_2$ to the actual wall surface coordinate W formed by the wall surface 12 are known. Further, it is assumed that distance from the $T_0$ to the reference marks $T_1$ and $T_2$ is known ($T_1$ and $T_2$, respectively), a vector from the reference mark $T_0$ to the reference mark $T_1$ is in X-axis direction of the wall surface coordinate W, a vector from the reference mark $T_0$ to the reference mark $T_2$ is in Y-axis direction of the wall surface coordinate W, and a normal line direction of the wall surface 12 is Z axis. In this case, positions of the reference marks $T_0$, $T_1$, and $T_2$ on the standard coordinate T are $T_0$ (0, 0, 0), $T_1$ ($T_1$, 0, 0), and $T_2$ (0, $T_2$, 0), respectively. On the other hand, because the wall surface coordinate W is in a relation that the standard coordinate T is translated, following equation is applied.

$$(W_X, W_Y, W_Z) = (T_X - X_0, T_Y - Y_0, T_Z - Z_0) \tag{1}$$

The optical axis coordinate O ($O_X$, $O_Y$, $O_Z$) is configured with an optical axis direction of the digital camera 24 as Z axis, longitudinal direction of the imaging surface 30 of the digital camera 24 as X axis, and short side direction of the digital camera 24 as Y axis, and camera position $T_C$ ($T_{CX}$, $T_{CY}$, $T_{CZ}$) on the standard coordinate T of the digital camera 24 as origin. Here, it is assumed that the digital camera 24 focuses at the origin of the optical axis coordinate O.

The imaging coordinate S ($S_X$, $S_Y$, $S_Z$) is configured with its origin on a position set by translating the optical axis coordinate O in Z-axis direction and distancing for focal length $f_0$ of the digital camera 24. Therefore, relation between the imaging coordinate S and the optical axis coordinate O is ($S_X$, $S_Y$, $S_Z$) = ($O_X$, $O_Y$, $O_Z + f_0$). Moreover, because all of the image data 18 are formed on the imaging surface 30, position $S_D$ of the dot D configuring the image data 18 on the imaging coordinate S is ($S_{DX}$, $S_{DY}$, 0). Here, the plane coordinate P of the above-mentioned image data processing unit 26 comes to have scaling relation with an orthogonal plane coordinate which extracted the X axis component and Y axis component of the optical axis coordinate O.

Because the reference marks $T_0$, $T_1$, and $T_2$ are photographed in the image data 18, the reference marks $T_0$, $T_1$, and $T_2$ exist in positions of $S_{DTi}$ ($S_{DTXi}$, $S_{DTYi}$, 0), (i=0, 1, 2) on the imaging coordinate S.

Meanwhile, relation between point $O_{Ti}$ on the optical axis coordinate O and the reference mark $T_i$ ($T_{Xi}$, $T_{Yi}$, $T_{Zi}$) (i=0, 1, 2) on the standard coordinate T becomes as follows:

$$O_{Ti}(O_{TXi}, O_{TYi}, O_{TZi}) = R[T_i(T_{Xi}, T_{Yi}, T_{Zi}) - \Delta] \quad (2)$$

$$R = \begin{pmatrix} \cos\beta\cos\gamma & \cos\alpha\sin\gamma + \sin\alpha\sin\beta\cos\gamma & \sin\alpha\sin\gamma - \cos\alpha\sin\beta\cos\gamma \\ -\cos\beta\cos\gamma & -\cos\alpha\cos\gamma - \sin\alpha\sin\beta\sin\gamma & \sin\alpha\cos\gamma + \cos\alpha\sin\beta\sin\gamma \\ \sin\beta & -\sin\alpha\cos\beta & \cos\alpha\cos\beta \end{pmatrix}$$

In equation (2), $\alpha$ is rotation angle of the $O_X$ axis when spinning around $T_X$ axis, $\beta$ is rotation angle of the $O_Y$ axis when spinning around $T_Y$ axis, $\gamma$ is rotation angle of the $O_Z$ axis when spinning around $T_Z$ axis, R is rotation matrix of $\alpha$, $\beta$, and $\gamma$, and $\Delta$ is a vector from the origin $T_0$ of the standard coordinate T to the camera position $T_C$ of the digital camera 24.

Moreover, relation between $S_{Ti}$ and the point $O_{Ti}$ ($O_{TXi}$, $O_{TYi}$, $O_{TZi}$) (i=0, 1, 2) on the optical axis coordinate O becomes as follows:

$$S_{TXi} = -f_0 \cdot O_{TXi}/O_{TZi}$$

$$S_{TYi} = -f_0 \cdot O_{TYi}/O_{TZi}$$

Therefore, in the image data processing unit 26, it is programmed that an unknown is assumed to be the camera position $T_C$ ($T_{CX}$, $T_{CY}$, $T_{CZ}$) and the rotation angels $\alpha$, $\beta$, and $\gamma$ and the known reference mark $T_i$ ($T_{Xi}$, $T_{Yi}$, $T_{Zi}$) (i=0, 1, 2) is substituted in the equations (2) and (3) on the standard coordinate T to calculate the values $S_{Ti}$ ($S_{TXi}$, $S_{TYi}$, 0) on the imaging coordinate S of the reference mark $T_i$, an absolute value of difference between the point $S_{DTi}$ ($S_{DTXi}$, $S_{DTYi}$, 0), (i=0, 1, 2) indicating the reference marks $T_0$, $T_1$, and $T_2$ on the imaging coordinate S obtained by photographing is calculated, and the above-mentioned unknown is calculated by minimum binary so that the sum of the absolute values becomes minimum. These constants become camera information indicating position or inclination of the digital camera 24.

Therefore, the image data processing unit 26 is programmed to calculate processing for coordinate transformation of an arbitrary coordinate $S_D$ ($S_{DX}$, $S_{DY}$, 0) of dot D on the imaging coordinate S into a coordinate $W_D$ ($W_{DX}$, $W_{DY}$, 0) of dot D on the wall surface coordinate W via a coordinate $O_D$ ($O_{DX}$, $O_{DY}$, $O_{DZ}$) of dot D on the optical axis coordinate O and coordinate $T_D$ ($T_{DX}$, $T_{DY}$, 0) of dot D on the standard coordinate T by use of the constant acquired by the above-mentioned minimum binary ($T_{CX}$, $T_{CY}$, $T_{CZ}$, $\alpha$, $\beta$, $\gamma$) and equations (1) to (3) and to output the coordinate $W_D$ as the corrected image data 20. Due to such a program, non-dimensional position information on all the image data 18 are transformed into a coordinate on the wall surface coordinate W having a dimension of length and it becomes possible to create the corrected image data 20 which displays an image shown by the position information according to the image data 18 and color information possessed by each of the position information so that the image is corrected in a manner that the image is photographed from front of the wall surface and has position information including the dimension of length. Here, if there is distortion in the a lens (not shown), it is required that the image data 18 is corrected by an application for image correction which is installed in the personal computer (not shown) and is storing aberration data of the lens and then the above-mentioned processing for coordinates transformation is carried out.

The design CAD data 22 is data having an extension which can be recognized by the later-described display unit, configured by dots $D_P$ aligned with an equal space on the plane coordinate P, and can be displayed on the monitor via the later-described display unit by giving color information to the dot $D_P$ so that outer circumference of the designed filler metal on the wall surface 12 can be connected by a line. It is assumed that the design CAD data 22 is recorded in a hard disc of the personal computer (not shown) or an auxiliary memory medium such as a CD-R (not shown) and is read out by the later-described display unit 28. Moreover, data indicating the origin on the wall surface coordinate W is added to the design CAD data to be associated with an image drawn by the design CAD data 22, and position of the image drawn by the design CAD data 22 is defined with the origin as a standard. Then, the wall surface coordinate W having dimension of length is added to the design CAD data 22 in a manner that the wall surface coordinate W is associated with the non-dimensional plane coordinate P. Here, transformation of the corrected image data 20 and the design CAD data 22 from the wall surface coordinate W to the plane coordinate P is carried out by use of the same function.

The display unit 28 is an application installed in the personal computer (not shown) similarly to the image data processing unit 26, reads out the corrected image data 20 and the design CAD data 22, and outputs the data as images on a monitor (not shown) of the personal computer (not shown) on one same display. The display unit 28 is programmed to translate all the position information of the corrected image data 20 to match the origin of the wall surface coordinate W that the corrected image data 20 calculated by the position information has and the origin of the wall surface coordinate W that the design CAD data has by use of known position information of the reference marks $T_0$, $T_1$, and $T_2$ on the wall surface coordinate W, and similarly to the image data processing unit 26, to output the corrected image data 20 and the design CAD data 22 on a monitor 32 following the non-dimensional plane coordinate P. Thus, difference in positions shown by the corrected image data 20 and the design CAD data 22 disappears and it becomes possible to compare designed position and installation position of the filler metal 14. Moreover, the display unit 28 is programmed to read out information regarding the wall surface coordinate W having the dimension of length that the corrected image data 20 or the design CAD data 22 has and to display the value of the length at points corresponding to the length on an axis of the plane coordinate P with a certain interval. Here, the image data processing unit 26 and the display unit 28 are operated by an operation system (not shown) mounted on the personal computer (not shown) and each application draws an image on a window (not shown) of the each application displayed on the monitor 32. Therefore, it is assumed that all the images can be displayed on one monitor 32 and the same is applied to an application according to the following embodiments.

On the basis of the above-mentioned configuration, operation of a filler metal installation position checking method and a filler metal installation position checking system 10 according to a first embodiment will be explained.

Figure 3:
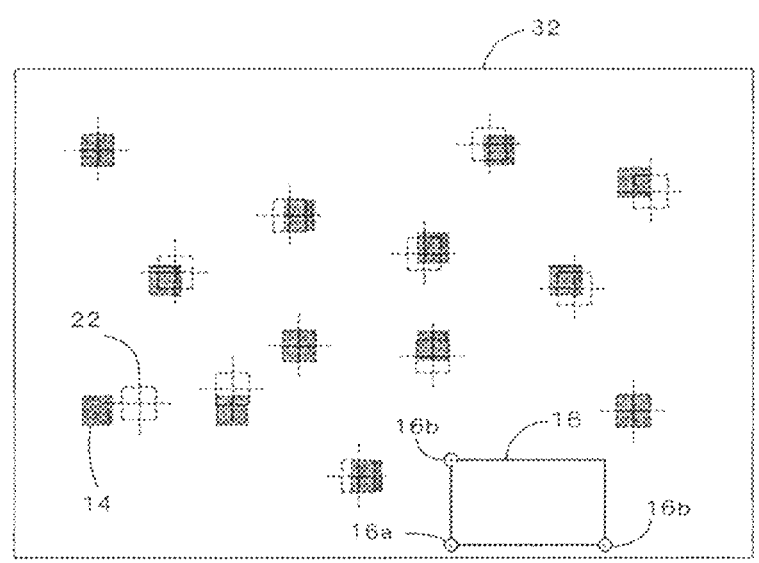
FIG. 3 is a schematic front view showing the filler metal and design CAD data of the first embodiment in an overlapping manner as images.

First, the standard surface target 16 is provided in front of the wall surface 12 where the filler metal 14 is embedded. At this time, inclination or position of the standard surface target 16 is adjusted by use of a level or the like so that the reference marks $T_0$ and $T_1$ become horizontal, the reference marks $T_0$ and $T_2$ become vertical, the reference marks $T_0$, $T_1$, and $T_2$ come to have the same distance ($Z_0$) from the wall surface 12. Then, a photographer (not shown) takes a photograph of the wall surface 12, from the predetermined position, where the filler metal 14 is embedded including the standard surface target 16 by use of the digital camera 24 to create image data, which is stored in a memory means (not shown). Subsequently, the image data processing unit 26 installed in the personal computer (not shown) reads out the image data 18 stored in the memory means (not shown) and on the basis of the above-mentioned processing, designates the reference marks $T_0$, $T_1$, and $T_2$ displayed by the image data 18 to specify positions of each reference mark on the plane coordinate P. Then, each of the reference marks thus specified and focal length are inputted, camera information according to the position and inclination of the digital camera 24 is calculated by the above-mentioned photogrammetry, and all the dots D on the image data 18 are transformed into the wall surface coordinate W on the basis of the camera information to create the corrected image data 20, which is equivalent to an image of the image data 18 taken from front of the wall surface, and the corrected image data 20 is outputted to the display unit 28. The display unit 28 to which the corrected image data 20 is inputted reads out the design CAD data 22, matches origins of the wall surface coordinate W of the corrected image data 20 and the design CAD data 22, and outputs the both data on the monitor 32 putting the both data on one same plane coordinate P. Then, as shown in FIG. 3, the corrected image data 20 and the design CAD data 22 are displayed on the monitor 32 in an overlapping manner to enable comparison of designed position and installation position of the filler metal 14.

Therefore, according to the first embodiment, an image photographed from front which is acquired from an image photographed at an arbitrary position with an arbitrary posture and an image of the design CAD data 22 indicating designed position of the filler metal 14 are displayed on one same display in an overlapping manner. Therefore, it becomes possible to visually judge difference between the designed position and actually installed installation position of the filler metal 14 on the display. Moreover, it becomes unnecessary to visit the installation site of the filler metal 14 to compare the installation condition with the drawing or the like. Therefore, it becomes possible to efficiently check a problem in the installation position of the filler metal 14. Further, because a photograph can be taken at an arbitrary position with an arbitrary posture, it becomes possible to efficiently check a problem with the embedded filler metal without using a large-scale surveying tool and it also becomes possible to configure the filler metal installation position checking system 10 which realizes the above method.

FIG. 4 shows a filler metal installation position checking method and a filler metal installation position checking system according to a second embodiment.

The filler metal installation position checking method according to the second embodiment includes steps of: providing the standard surface target 16 with known actual dimension and position to a wall surface 12 on the wall surface 12 where a filler metal 14 is installed; creating image data 18 by taking a photograph of the wall surface 12 including the standard surface target 16; converting the image data 18 into corrected image data 20 displaying an image corrected in a manner that the image is photographed from front of the wall surface 12 by use of the actual position and dimension of the standard surface target 16 and position and dimension of the standard surface target 16 on an image displayed by the image data 18; creating installation CAD data 34 indicating an actual installation position of the filler metal 14 from the corrected image data 20; reading design CAD data 22 for displaying actual designed position of the filler metal 14; and outputting the installation CAD data 34 and the design CAD data 22 as images to be displayed on one same display. A filler metal installation position checking system 10 according to the second embodiment includes: a standard surface target 16 with actual dimension and position known to a wall surface 12 where a filler metal 14 is installed; a digital camera 24 for photographing the wall surface 12 and the standard surface target 16 and for creating image data 18; an image data processing unit 26 for converting the image data 18 into corrected image data 20 displaying a corrected image in a manner that the image is photographed from front of the wall surface 12 and outputting the corrected image data by use of the actual position and dimension of the standard surface target 16 and position and dimension of the standard surface target 16 on an image displayed by the image data 18; an installation CAD data processing unit 36 for creating and outputting installation CAD data 34 which inputs the corrected image data 20 to display actual installation position of the filler metal 14 from the corrected image data 20; and a display unit 28 for inputting the installation CAD data 34 and the design CAD data 22 which shows actual designed position of the filler metal 14 and for outputting the installation image data 34 and the design CAD data 22 as images on one same display.

In FIG. 4-a, the installation CAD data processing unit 36 is an application installed in a personal computer (not shown) which creates and outputs the installation CAD data 34 for displaying position information of the filler metal 14 in silhouette using the corrected image data 20.

A value of color information of a dot D of a filler metal portion displayed by the corrected image data 20 is in a predetermined range. Therefore, the installation CAD data processing unit 36 is programmed to search for a dot D on a plane coordinate P and to detect a dot D having a value of color information which is so large that difference between the color information of the detected dot D and an adjacent color information becomes a predetermined threshold or more. The installation CAD data processing unit 36 is programmed to input the threshold manually. Thus, an appropriate threshold is set by an operator and the dot D thus detected is extracted as a dot D to be on outer circumference of the filler metal 14 displayed by the image data 18. Moreover, the installation CAD data processing unit 36 is programmed to search for the extracted dot D configuring the outer circumference point of the filler metal 14, and in a case where an adjacent dot D also configures the outer circumference point of the filler metal, to give a predetermined value of color information to a dot $D_P$ which is on a line connecting the dots D on the plane coordinate P so that the dot $D_P$ is outputted as the installation CAD data 34. Thus, it becomes possible to configure the installation CAD data 34 which displays the silhouette of each of filler metals 14 by a line. At this time, it is required to include more dots $D_P$ of the plane coordinate P than the dots D of an imaging coordinate S, in other words, to set resolution high. Therefore, the installation CAD data processing unit 36 is programmed to cause the dots D to be aligned configuring the plane coordinate P with an equal interval by the unit of a few $D_P$ similarly to the alignment on the imaging coordinate S.

Moreover, in a case where same filler metals 14 are embedded in the wall surface, a value of color information of the dot D of the filler metal portion shown by the corrected image data 20 is limited within a predetermined range, as mentioned above. In addition, difference of size of the filler metal 14 is also limited within a predetermined range. Therefore, the installation CAD data processing unit 36 extracts a dot D having a value of color information within a previously specified range and being a filler metal point configuring the filler metal 14, calculates an area where dots D are adjacent with each other (calculates number of dots D corresponding to such a condition) and in a case where the area is within a predetermined range, dots D configuring the color information and position information are assumed to be filler metal points configuring one filler metal 14 and number information of the filler metal is added. Then, the installation CAD data processing unit 36 may be programmed that among filler metal points having the same number, a point having a point other than a filler metal point (a point configuring the wall surface 12) in an adjacent point (a point where the color information exceeds a predetermined range) is extracted as an outer circumference point of the filler metal 14, and in a case where the adjacent dot D also configures the outer circumference point of the filler metal 14, a predetermined value of color information is given to a dot $D_P$ on a line connecting the dots D configuring the outer circumference points on the plane coordinate P, and the points are outputted as the installation CAD data 34. In a case where the installation CAD data 34 is configured according to either embodiment, it is preferable that values of color information of the dot $D_P$ for displaying the silhouette of the filler metal 14 of the design CAD data 22 and the installation CAD data 34 are set to have different values. Thus, it becomes possible to prevent an operator from confusing the silhouette of the filler metal 14 drawn by the design CAD data 22 and the silhouette of the filler metal 14 drawn by the installation CAD data 34.

The display unit 28 is an application installed in the personal computer (not shown) and is programmed to output the installation CAD data 34 and the design CAD data 22 on the basis of the plane coordinate P as shown in FIG. 4-b if both of the data are inputted. Here, an operation to match origins of the wall surface coordinate W of the installation CAD data 34 and the design CAD data 22 is programmed to carry out the same procedures as those of the first embodiment.

Therefore, according to the second embodiment, an image of the installation CAD data 34 showing actual installation position of the filler metal 14 which is acquired from an image photographed on the site at an arbitrary position with an arbitrary posture and an image of the design CAD data 22 showing actual designed position of the filler metal 14 are displayed on one same display in an overlapping manner. At this time, the images shown by the installation CAD data 34 and the design CAD data 22 correctly display silhouette of the filler metal 14 on the basis of respective data. Therefore, in addition to the above-mentioned effect, it becomes possible to correctly and visually judge difference between designed position and actually installed installation position of the filler metal 14 on a screen of the monitor and to configure the filler metal installation position checking system 10 realizing the above.

FIG. 5 shows a filler metal installation position checking method and a filler metal installation position checking system according to a third embodiment.

The filler metal installation position checking method according to the third embodiment includes steps of: providing the standard surface target 16 with known actual dimension and position to a wall surface 12 on the wall surface 12 where a filler metal 14 is installed; creating image data 18 by taking a photograph of the wall surface 12 together with the standard surface target 16; converting the image data 18 into corrected image data 20 displaying an image corrected in a manner that the image is photographed from front of the wall surface 12 by use of the actual position and dimension of the standard surface target 16 and position and dimension of the standard surface target 16 on an image displayed by the image data 18; creating installation CAD data 34 indicating an actual installation position of the filler metal 14 and installed filler metal data 38 displaying actual installed center position of the filler metal 14 from the corrected image data 20; reading design CAD data 22 for displaying designed position of the filler metal with an actual dimension and designed filler data 40 showing actual designed center position of the filler metal 14; outputting and displaying the inputted installation CAD data 34 and the design CAD data 40 on one same display as images; associating the installed filler metal data 38 and the designed filler metal data 40; creating difference data 42 by calculating actual difference from the designed position of the filler metal by the difference between the associated installed filler metal data 38 and the designed filler metal data 40; and outputting the difference data 42 thus calculated as actual numerical value for displaying. A filler metal installation position checking system 10 according to the third embodiment includes: a standard surface target 16 with actual dimension and position known to a wall surface 12 where a filler metal 14 is embedded; a digital camera 24 for photographing the wall surface 12 and the standard surface target 16 to create image data 18; an image data processing unit 26 for converting the image data 18 into corrected image data 20 displaying a corrected image in a manner that the image is photographed from front of the wall surface 12 and outputting the corrected image data by use of the actual position and dimension of the standard surface target 16 and position and dimension of the standard surface target 16 on an image displayed by the image data 18; an installation CAD data processing unit 36 for creating and outputting installation CAD data 34 which displays actual installation position of the filler metal 14 by inputting the corrected image data 20; an installed filler metal data processing unit 44 for creating and outputting installed filler metal data 38 which displays center position of the actual filler metal 14 by inputting the corrected image data 20; a difference measuring unit 46 for inputting the installed filler metal data 38 and the designed filler metal data 40 indicating designed center position of actual filler metal 14, associating the installed filler metal data 38 and the designed filler metal data 40, calculating actual difference of the filler metal 14 from the designed position by the difference of the installed filler metal data 38 and the designed filler metal data 40 thus associated, and outputting difference data 42; and a display unit 48 for inputting the installation CAD data 34 and design CAD data 22 which shows actual designed position of the filler metal 14, for outputting the installation CAD data 34 and the design CAD data 22 thus inputted as images on one same display, and for simultaneously outputting the inputted difference data 42 as a numerical value on the display.

As shown in FIG. 5-a, the installed filler metal data processing unit 44 is an application installed in a personal computer (not shown) for identifying filler metals 14 on the corrected image data 20 respectively, calculating data indicating center position, and outputting the data. The installed filler metal data processing unit 44 extracts a dot $D_P$ which is a filler metal point configuring the filler metal 14 corresponding to color information within a previously designated range, calculates an area of dot $D_P$ corresponding to all the designated ranges adjacent to position information of one dot $D_P$ corresponding to the designated range (calculates number of corresponding dots $D_P$), and if the number is within a predetermined range, gives number data which do not overlap to each dot $D_P$ group configuring a filler metal having a predetermined area, and also gives number data which do not overlap to dot $D_P$ groups configuring the filler metal 14 to dots $D_P$ corresponding to other parts (wall surface 12). Then, sum of a value of vertical axis of the dot $D_P$ belonging to one dot $D_P$ group and a value of horizontal axis thereof is divided by the number of dots $D_P$ belonging to the one dot $D_P$ group to calculate center position of the area of the one dot $D_P$ group. Then, the installed filler metal data 38, which is addition of the corrected image data 20, the number data, and center position data of a dot $D_P$ belonging to the number one, is outputted. Thus, it becomes possible to recognize the color information corresponding to the designated range and one dot group $D_P$ including position information as a mass of filler metal points configuring one filler metal 14, distinct the filler metal 14 from the wall surface 12 from an image displayed by the corrected image data 20, recognize respective filler metals 14, and calculate center positions of respective filler metals 14.

The difference measuring unit 46 is also an application installed in the personal computer (not shown) and is for associating the above-mentioned installed filler metal data 38 and the designed filler metal data 40 indicating actual designed center position of the filler metal for each of the filler metals 14, that is, for associating each of the designed position of the filler metals 14 and actually installed filler metals 14. Here, the designed filler metal data 40 is a row of data indicating center position of each of filler metals 14 on the plane coordinate P. The difference measuring unit 46 is programmed to calculate distance on the plane coordinate P between data indicating center position of an installed filler metal 14 of one number in the installed filler metal data 38 and data indicating center position of each of filler metals 14 of the designed filler metal data 40, select data indicating one center position of the nearest designed filler metal data 40 and output distance thereof, repeat the same procedure between data indicating respective center position of other installed filler metals 14 and data indicating respective center position of other designed filler metal data 40 to respectively associate center position of the filler metals 14 in the designed position and center position of actually installed filler metals 14, convert each distance (difference) into distance on the wall surface coordinate W, that is, actual distance, to create and output difference data 42, and add the distance to the installed filler metal data 38 for each of the numbers indicating corresponding filler metal 14. Here, the association is carried out on an assumption that number of designed filler metals 14 and actually installed filler metal 14 match and a designed filler metal which is in the nearest position from the installed filler metal 14 corresponds to a filler metal 14 before moving from the designed position on the wall surface 12.

As shown in FIG. 5-*b*, the display unit 48 outputs inputted difference data 42 to display an actual numerical value on the display, in addition to the configuration of the first and second embodiments. The display unit 48 is programmed to translate a position of each filler metal 14 indicating actual difference on the plane coordinate P for a predetermined distance from the center position of each of the filler metals 14. Thus, it becomes possible to display actual difference of each of the installed filler metals 14 from designed positions without overlapping the filler metal 14 displayed on the monitor 32 as an image. Moreover, the display unit 48 can convert information of a cursor position of a mouse means (not shown) on the monitor 32 into position information on the plane coordinate P, and is programmed to read out the position information and difference which attributes to number data regarding a dot $D_P$ of the same position information in the difference data 42, to give color information to cause the dot $D_P$ of the plane coordinate P to draw a numerical value regarding the difference as a letter, and to output the letter on the monitor. The display unit 48 is programmed to erase the color information and to display a numerical value regarding difference attributing to the number data in a case where the cursor is further moved on a dot $D_P$ belonging to the different number data. Thus, if an operator moves a cursor 50 of the mouse means to a part corresponding to the filler metal 14 on the displayed installed filler metal data 38, difference between designed position of the filler metal 14 and installation position thereof is displayed on the monitor 32. Here, because there is no numerical value regarding difference in a dot $D_P$ of a part corresponding to the wall surface 12 (the numerical value may be zero), if the cursor 50 is moved thereon, display of a numerical value regarding difference is erased on the monitor 32. Needless to say, difference between designed position and installation position of all the filler metals 14 may be simultaneously displayed in the vicinity of each filler metal 14.

Therefore, according to the third embodiment, an image of the installation CAD data 34 showing actual installation position of the filler metal 14 which is acquired from an image photographed at an arbitrary position with an arbitrary posture and an image of the design CAD data 22 showing actual designed position of the filler metal 14 are displayed on one same display in an overlapping manner. At this time, the images shown by the installation CAD data 34 and the design CAD data 22 correctly display silhouette of the filler metal 14 on the basis of respective data and difference between designed position and actually installed installation position of the filler metal 14 is displayed numerically. Therefore, not only can the difference between designed position of the filler metal 14 and actually installed installation position be correctly and visually judged, but also length of difference between designed position and actually installed installation position of the filler metal 14 can be objectively judged and it becomes possible to configure the filler metal installation position checking system 10 realizing the above.

FIG. 6 shows modification examples of the first to third embodiments.

In any of the embodiments, as shown in FIG. 6-*a*, a building standard core 52 with the origin of the wall surface coordinate W as an intersection point may be drawn on the wall surface 12. For the building standard core 52, lines may be drawn from the origin in X-axis direction (horizontal direction) and Y-axis direction (vertical direction) of the wall surface coordinate W. In this case, it is required that the building standard core 52 is also drawn in the design CAD data 22 with the origin as a standard. Thus, it becomes possible to judge whether or not there is difference in the origin of the corrected image data 20 and the design CAD data 22 on the wall surface coordinate W and whether or not there is declination between images shown by both data. For the case where such a difference occurs, the display unit 28 may be programmed to translate or rotationally transfer position information of the dot $D_P$ on the plane coordinate P configuring the corrected image data 20 so that the difference is corrected.

In any embodiment, as shown in FIG. 6-*b*, it is possible to add design tolerance data 54 indicating a range of design tolerance of a filler metal in the design CAD data 22. Specifically, the design tolerance data 54, in which predetermined color information is given to all the dots $D_P$ on a line so that silhouette of range of design tolerance of each of the filler metals 14 can be drawn by the line on the plane coordinate P, may be added to the design CAD data 22. Here, it is preferable that different color information is used respectively for the color information of the dot $D_P$ indicating the silhouette of the designed position of the filler metal 14 and the color information of the dot $D_P$ regarding the design tolerance data 54 to prevent confusion. Adopting such a configuration enables to visually judge whether or not the installed filler metal 14 is within a range of installation permissible tolerance and to configure a filler metal installation position checking system 10 realizing the above. Moreover, color information may be given to the dot $D_P$ so that a silhouette line of the filler metal 14 indicated by each data can be not only colorful but also solid or broken line.

In any embodiment, it is assumed that an image is taken by the digital camera 24 to create the image data 18. However, an image may be photographed by other filming equipment such as a silver salt camera (not shown) and the photograph (not shown) may be scanned by a scanner (not shown), to create the image data 18.

In any embodiment, the display units 28 and 48 may be programmed to recognize position information of the cursor 50 indicated by the mouse means (not shown) on the monitor as position information on the plane coordinate P and to display a value of the position information on the monitor 32 corresponding to the plane coordinate P and actual wall surface coordinate W. Thus, it becomes possible to display a position specified by a cursor on the monitor display indicated by the corrected image data 20, the installation CAD data 34, and the design CAD data 22 as an actual value.

The invention realized by the above-mentioned specific embodiments can have following aspects.

A filler metal installation position checking method according to the present invention includes steps of: providing a standard surface target with known dimension and position on a wall surface where a filler metal is installed; creating image data by taking a photograph of the wall surface including the standard surface target; converting the image data into corrected image data displaying an image corrected in a manner that the image is photographed from front of the wall surface by use of the actual position and dimension of the standard surface target and position and dimension of the standard surface target on an image displayed by the image data; reading design CAD data displaying designed position of the actual filler metal; and outputting the corrected image data and the design CAD data respectively as images on one same display.

Adopting such a configuration causes an image photographed from front, which is obtained from an image photographed on site at an arbitrary position with an arbitrary posture, and an image of design CAD data showing designed position of the filler metal to be displayed on one same display in an overlapping manner. Therefore, it becomes possible to visually judge difference between designed position and actually installed position of the filler metal on the display. Moreover, it becomes unnecessary to go to the site where the filler metal is installed and to check the actual position with a drawing or the like. Therefore, it becomes possible to efficiently check a problem with the installation position of the filler metal. Further, since photograph can be taken at an arbitrary position with an arbitrary posture, it becomes possible to check a problem with the installation position of the filler metal efficiently without using a large-scale surveying tool.

Moreover, the present invention includes steps of: providing a standard surface target with known dimension and position to a wall surface where a filler metal is installed; creating image data by taking a photograph of the wall surface together with the standard surface target; converting the image data into corrected image data displaying an image corrected in a manner that the image is photographed from front of the wall surface by use of the actual position and dimension of the standard surface target and position and dimension of the standard surface target on an image displayed by the image data; creating installation CAD data indicating actual installation position of the filler metal from the corrected image data; reading design CAD data for displaying actual designed position of the filler metal; and outputting the installation CAD data and the design CAD data respectively as images on one same display.

According to such a configuration, an image of the installation CAD data showing actual installation position of the filler metal which is acquired from an image photographed on the site at an arbitrary position with an arbitrary posture and an image of the design CAD data showing actual designed position of the filler metal are displayed on one same display in an overlapping manner. At this time, the images shown by the installation CAD data and the design CAD data correctly display silhouette of the filler metal on the basis of respective data. Therefore, in addition to the above-mentioned effect, it becomes possible to correctly and visually judge difference between designed position and actually installed installation position of the filler metal on the display.

Further, the present invention includes steps of: providing a standard surface target with known dimension and position to the wall surface where a filler metal is installed; creating image data by taking a photograph of the wall surface together with the standard surface target; converting the image data into corrected image data displaying an image corrected in a manner that the image is photographed from front of the wall surface by use of the actual position and dimension of the standard surface target and position and dimension of the standard surface target on an image displayed by the image data; creating installation CAD data indicating actual installation position of the filler metal from the corrected image data and installed filler metal data showing actual installed center position of the filler metal; reading design CAD data for displaying actual designed position of the filler metal and the designed filler metal data indicating actual designed center position of the filler metal; displaying the inputted installation CAD data and the design CAD data on one same display as images; associating the installed filler metal data and the designed filler metal data; creating difference data by calculating actual difference from the designed position of the filler metal by the difference between the associated installed filler metal data and the designed filler metal data; and outputting the difference data thus calculated as actual numerical value for displaying.

According to such a configuration, an image of the installation CAD data showing actual installation position of the filler metal which is acquired from an image photographed on the site at an arbitrary position with an arbitrary posture and an image of the design CAD data showing actual designed position of the filler metal are displayed on one same display in an overlapping manner. At this time, the images displayed by the installation CAD data and the design CAD data correctly display silhouette of the filler metal on the basis of respective data and difference between designed position and actually installed installation position of the filler metal is numerically displayed. Therefore, not only can the difference between designed position and actually installed installation position of the filler metal be correctly and visually judged, but also length of difference between designed position and actually installed installation position of the filler metal can be objectively judged.

In the present invention, design tolerance data indicating a range of design tolerance of a filler metal is added to the design CAD data.

According to such a configuration, it becomes possible to visually judge whether or not an installed filler metal is within a range of installation permissible tolerance.

Meanwhile, a filler metal installation position checking system according to the present invention includes: a standard surface target with known actual dimension and position to a wall surface where a filler metal is installed; a camera for photographing the wall surface together with the standard surface target to create image data; an image data processing unit for converting the image data into corrected image data displaying an image corrected in a manner that the image is photographed from front of the wall surface and outputting the corrected image data by use of the actual position and dimension of the standard surface target and position and dimension of the standard surface target on an image displayed by the image data; and a display unit for inputting the corrected image data and design CAD data which shows actual designed position of the filler metal and outputting the corrected image data and the design CAD data as an image on one same display.

Adopting such a configuration enables to configure a filler metal installation position checking system which allows a user to visually judge difference between designed position and actually installed installation position of the filler metal because an image photographed from front, which is obtained from an image photographed on site at an arbitrary position with an arbitrary posture, and an image of design CAD data showing designed position of the filler metal are displayed on one same display in an overlapping manner. Moreover, it becomes possible to configure a filler metal installation position checking system which allows a user to efficiently check a problem with the installation position of the filler metal because it becomes unnecessary to go to the site where the filler metal is installed and to check the actual position with a drawing or the like. Further, since photograph can be taken at an arbitrary position with an arbitrary posture, it becomes possible to configure a filler metal installation position checking system which allows a user to check a problem with the installation position of the filler metal efficiently without using a large-scale surveying tool.

Moreover, the present invention includes: a standard surface target with known actual dimension and position to a wall surface where a filler metal is installed; a camera for photographing the wall surface together with the standard surface target to create image data; an image data processing unit for converting the image data into corrected image data displaying an image corrected in a manner that the image is photographed from front of the wall surface and outputting the corrected image data by use of the position and dimension of the standard surface target and position and dimension of the standard surface target on an image displayed by the image data; an installation CAD data processing unit for creating and outputting installation CAD data which displays actual installation position of the filler metal from the corrected image data by inputting the corrected image data; and a display unit for inputting the installation CAD data and design CAD data which shows actual designed position of the filler metal and for outputting the image data and the design CAD data respectively as an image on one same display.

According to such a configuration, an image of the installation CAD data showing actual installation position of the filler metal which is acquired from an image photographed on the site at an arbitrary position with an arbitrary posture and an image of the design CAD data showing actual designed position of the filler metal are displayed on one same display in an overlapping manner. At this time, the images shown by the installation CAD data and the design CAD data correctly display silhouette of the filler metal on the basis of respective data. Therefore, in addition to the above-mentioned effect, it becomes possible to configure a filler metal installation position checking system which enables to correctly and visually judge difference between designed position and actually installed installation position of the filler metal on a screen.

Further, the present invention includes: a standard surface target with known actual dimension and position to a wall surface where a filler metal is installed; a camera for photographing the wall surface together with the standard surface target to create image data; an image data processing unit for converting the image data into corrected image data displaying an image corrected in a manner that the image is photographed from front of the wall surface and outputting the corrected image data by use of the actual position and dimension of the standard surface target and position and dimension of the standard surface target on an image displayed by the image data; an installation CAD data processing unit for creating and outputting installation CAD data which displays actual installation position of the filler metal by inputting the corrected image data; an installed filler metal data processing unit for creating and outputting installed filler metal data which displays center position of the actual filler metal by inputting the corrected image data; a difference measuring unit for inputting the installed filler metal data and the designed filler metal data indicating designed center position of actual filler metal, associating the installed filler metal data and the designed filler metal data, calculating actual difference from the designed position by the difference of the installed filler metal data and the designed filler metal data thus associated, and outputting difference data; and a display unit for inputting the installation CAD data and design CAD data which shows actual designed position of the filler metal, for outputting the installation CAD data and the design CAD data thus inputted as images on one same display, and for outputting the inputted difference data as an actual numerical value on the display.

According to such a configuration, an image of the installation CAD data showing actual installation position of the filler metal which is acquired from an image photographed on the site at an arbitrary position with an arbitrary posture and an image of the design CAD data showing actual designed position of the filler metal are displayed on one same display in an overlapping manner. At this time, the images shown by the installation CAD data and the design CAD data correctly display silhouette of the filler metal on the basis of respective data and difference between designed position and actually installed installation position of the filler metal is displayed numerically. Therefore, not only can the difference between designed position of the filler metal and actually installed installation position be correctly and visually judged on the display, but also a filler metal installation position checking system which enables to objectively judge length of actual difference between designed position and actually installed installation position of the filler metal can be configured.

In the present invention, design tolerance data indicating a range of design tolerance of a filler metal is added to the design CAD data.

According to such a configuration, it becomes possible to configure a filler metal installation position checking system which enables to visually judge whether or not an installed filler metal is within a range of installation permissible tolerance.

The invention claimed is:

1. A filler metal installation position checking method comprising the steps of:
    providing a standard surface target with known dimension and position to a wall surface where a filler metal is installed;
    creating image data by taking a photograph of the wall surface from a direction crossing a normal line of the wall surface together with the standard surface target;

converting the image data into corrected image data displaying an image corrected in a manner that the image is photographed from front of the wall surface by use of the actual position and dimension of the standard surface target and position and dimension of the standard surface target on an image displayed by the image data,
wherein the converting of the image data occurs upon a same coordinate system as that of design CAD data for displaying an actual designed position of the filler metal;
reading the design CAD data for displaying the actual designed position of the filler metal; and
outputting images displayed by the corrected image data and the design CAD data on one same display,
wherein a value of color information of a dot D of a filler metal portion displayed by the corrected image data is in a predetermined range, and wherein the value of color information of the dot D is such that the difference between the color information of the detected dot D and an adjacent color information becomes a predetermined threshold or more.

2. A filler metal installation position checking method comprising the steps of:
providing a standard surface target with known dimension and position to a wall surface where a filler metal is installed;
creating image data by taking a photograph of the wall surface from a direction crossing a normal line of the wall surface together with the standard surface target;
converting the image data into corrected image data displaying an image corrected in a manner that the image is photographed from front of the wall surface by use of the actual position and dimension of the standard surface target and position and dimension of the standard surface target on an image displayed by the image data,
wherein the converting of the image data occurs upon a same coordinate system as that of design CAD data for displaying an actual designed position of the filler metal;
creating installation CAD data indicating actual installation position of the filler metal from the corrected image data;
reading the design CAD data for displaying the actual designed position of the filler metal; and
outputting the installation CAD data and the design CAD data respectively as an image on one same display,
wherein a value of color information of a dot D of a filler metal portion displayed by the corrected image data is in a predetermined range, and wherein the value of color information of the dot D is such that the difference between the color information of the detected dot D and an adjacent color information becomes a predetermined threshold or more.

3. A filler metal installation position checking method comprising the steps of:
providing a standard surface target with known dimension and position to a wall surface where a filler metal is installed;
creating image data by taking a photograph of the wall surface from a direction crossing a normal line of the wall surface together with the standard surface target;
converting the image data into corrected image data displaying an image corrected in a manner that the image is photographed from front of the wall surface by use of the actual position and dimension of the standard surface target and position and dimension of the standard surface target on an image displayed by the image data,
wherein the converting of the image data occurs upon a same coordinate system as that of a design CAD data for displaying an actual designed position of the filler metal;
creating installation CAD data indicating actual installation position of the filler metal from the corrected image data and installed filler metal data showing actual installed center position of the filler metal;
reading the design CAD data for displaying the actual designed position of the filler metal and designed filler metal data indicating actual designed center position of the filler metal;
displaying the inputted installation CAD data and the design CAD data respectively as an image on one same display; and
associating the installed filler metal data and the designed filler metal data, creating difference data by calculating actual difference from the designed position of the filler metal by the difference between the associated installed filler metal data and the designed filler metal data, and outputting the difference data thus calculated as actual numerical value for displaying,
wherein a value of color information of a dot D of a filler metal portion displayed by the corrected image data is in a predetermined range, and wherein the value of color information of the dot D is such that the difference between the color information of the detected dot D and an adjacent color information becomes a predetermined threshold or more.

4. The filler metal installation position checking method according to claim 1,
wherein design tolerance data indicating a range of design tolerance of a filler metal is added to the design CAD data.

5. A filler metal installation position checking system comprising:
a standard surface target with known actual dimension and position to a wall surface where a filler metal is installed;
a camera for photographing the wall surface from a direction crossing a normal line of the wall surface together with the standard surface target to create image data;
an image data processing unit for converting the image data into corrected image data displaying an image corrected in a manner that the image is photographed from front of the wall surface and outputting the corrected image data by use of the actual position and dimension of the standard surface target and position and dimension of the standard surface target on an image displayed by the image data,
wherein the converting of the image data occurs upon a same coordinate system as that of a design CAD data for displaying an actual designed position of the filler metal; and
a display unit for inputting the corrected image data and the design CAD data which shows the actual designed position of the filler metal and outputting the corrected image data and the design CAD data respectively as an image on one same display,
wherein a value of color information of a dot D of a filler metal portion displayed by the corrected image data is in a predetermined range, and wherein the value of color information of the dot D is such that the difference between the color information of the detected dot D and an adjacent color information becomes a predetermined threshold or more.

6. A filler metal installation position checking system comprising:
- a standard surface target with known actual dimension and position to a wall surface where a filler metal is installed;
- a camera for photographing the wall surface from a direction crossing a normal line of the wall surface together with the standard surface target to create image data;
- an image data processing unit for converting the image data into corrected image data displaying an image corrected in a manner that the image is photographed from front of the wall surface and outputting the corrected image data by use of the actual position and dimension of the standard surface target and position and dimension of the standard surface target on an image displayed by the image data,
- wherein the converting of the image data occurs upon a same coordinate system as that of a design CAD data for displaying an actual designed position of the filler metal;
- an installation CAD data processing unit for creating and outputting installation CAD data which displays actual installation position of the filler metal from the corrected image data by inputting the corrected image data; and
- a display unit for inputting the installation CAD data and the design CAD data which shows the actual designed position of the filler metal and outputting the image data and the design CAD data respectively as an image on one same display,
- wherein a value of color information of a dot D of a filler metal portion displayed by the corrected image data is in a predetermined range, and wherein the value of color information of the dot D is such that the difference between the color information of the detected dot D and an adjacent color information becomes a predetermined threshold or more.

7. A filler metal installation position checking system, comprising:
- a standard surface target with known actual dimension and position to a wall surface where a filler metal is installed;
- a camera for photographing the wall surface from a direction crossing a normal line of the wall surface together with the standard surface target to create image data;
- an image data processing unit for converting the image data into corrected image data displaying an image corrected in a manner that the image is photographed from front of the wall surface and outputting the corrected image data by use of the position and dimension of the standard surface target and position and dimension of the standard surface target on an image displayed by the image data,
- wherein the converting of the image data occurs upon a same coordinate system as that of a design CAD data for displaying an actual designed position of the filler metal;
- an installation CAD data processing unit for creating and outputting installation CAD data which displays actual installation position of the filler metal by inputting the corrected image data;
- an installed filler metal data processing unit for creating and outputting installed filler metal data which displays actual center position of the filler metal by inputting the corrected image data;
- a difference measuring unit for inputting the filler metal data and the designed filler metal data indicating actual designed center position of the filler metal, associating the installed filler metal data and the designed filler metal data, calculating actual difference of the filler metal from the designed position by the difference of the installed filler metal data and the designed filler metal data thus associated, and outputting difference data; and
- a display unit for inputting the installation CAD data and the design CAD data which shows the actual designed position of the filler metal, for outputting the installation CAD data and the design CAD data thus inputted respectively as images on one same display, and for simultaneously outputting the inputted difference data as a numerical value on the display,
- wherein a value of color information of a dot D of a filler metal portion displayed by the corrected image data is in a predetermined range, and wherein the value of color information of the dot D is such that the difference between the color information of the detected dot D and an adjacent color information becomes a predetermined threshold or more.

8. The filler metal installation position checking system according to claim 5,
wherein design tolerance data indicating a range of design tolerance of a filler metal is added to the design CAD data.

9. The filler metal installation position checking method according to claim 2,
wherein design tolerance data indicating a range of design tolerance of a filler metal is added to the design CAD data.

10. The filler metal installation position checking method according to claim 3,
wherein design tolerance data indicating a range of design tolerance of a filler metal is added to the design CAD data.

11. The filler metal installation position checking system according to claim 6,
wherein design tolerance data indicating a range of design tolerance of a filler metal is added to the design CAD data.

12. The filler metal installation position checking system according to claim 7,
wherein design tolerance data indicating a range of design tolerance of a filler metal is added to the design CAD data.

* * * * *